US011801763B2

(12) United States Patent
Najmabadi

(10) Patent No.: US 11,801,763 B2
(45) Date of Patent: Oct. 31, 2023

(54) INTEGRATED DC VEHICLE CHARGER

(71) Applicant: Ford Global Technologies, LLC, Dearborn, MI (US)

(72) Inventor: Ali Najmabadi, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1061 days.

(21) Appl. No.: 15/847,269

(22) Filed: Dec. 19, 2017

(65) Prior Publication Data

US 2019/0184837 A1    Jun. 20, 2019

(51) Int. Cl.
*H02K 3/12* (2006.01)
*B60L 53/22* (2019.01)
*H02M 3/335* (2006.01)
*H02P 27/06* (2006.01)
*H02J 7/00* (2006.01)
*H02M 7/5387* (2007.01)
*H02M 7/537* (2006.01)
*H02M 1/00* (2006.01)

(52) U.S. Cl.
CPC .............. *B60L 53/22* (2019.02); *H02J 7/00* (2013.01); *H02M 3/33592* (2013.01); *H02M 7/53875* (2013.01); *H02P 27/06* (2013.01); *B60L 2210/10* (2013.01); *B60L 2210/40* (2013.01); *H02M 1/007* (2021.05); *H02M 7/537* (2013.01)

(58) Field of Classification Search
CPC .... H02M 25/024; H02P 9/42; H02P 2101/45; H02P 27/06; H02P 9/48; Y10T 10/7005; Y10T 10/7077; Y10T 10/7241; Y10T 10/645; Y10T 10/7066; Y10T 10/70; Y10T 90/127; Y10T 90/14; Y10T 10/7216; Y10T 10/705; Y10T 10/7055
USPC ..... 318/139, 42, 122, 400.31, 724, 748, 507
See application file for complete search history.

(56) References Cited

U.S. PATENT DOCUMENTS

| | | | |
|---|---|---|---|
| 4,920,475 A | 4/1990 | Rippel | |
| 7,379,309 B2 | 5/2008 | Isurin et al. | |
| 7,889,524 B2 | 2/2011 | Lee et al. | |
| 9,106,098 B2 | 8/2015 | Srinivasan et al. | |
| 2008/0094013 A1* | 4/2008 | Su | B60L 53/24 318/139 |
| 2009/0033274 A1* | 2/2009 | Perisic | H02P 4/00 318/771 |
| 2015/0314694 A1* | 11/2015 | Alakula | B60L 53/14 320/109 |
| 2016/0137052 A1* | 5/2016 | Nakamura | B60K 6/40 180/65.245 |
| 2017/0070175 A1* | 3/2017 | Butzmann | H02M 7/53871 |
| 2017/0085106 A1 | 3/2017 | Bai et al. | |

FOREIGN PATENT DOCUMENTS

WO    2017041144 A1    3/2017

\* cited by examiner

*Primary Examiner* — Eduardo Colon Santana
*Assistant Examiner* — Charles S Laughlin
(74) *Attorney, Agent, or Firm* — David B. Kelley; Brooks Kushman P.C.

(57) ABSTRACT

A vehicle has a drive system that includes a battery, two inverters, an electric machine, and switches. The vehicle also has a controller that, responsive to charge mode, operates the switches to couple one of the inverters to a charge port and operates at least one of the inverters such that DC current from the charge port sequentially flows through the one of the inverters, the electric machine, and the other of the inverters to the battery.

15 Claims, 3 Drawing Sheets

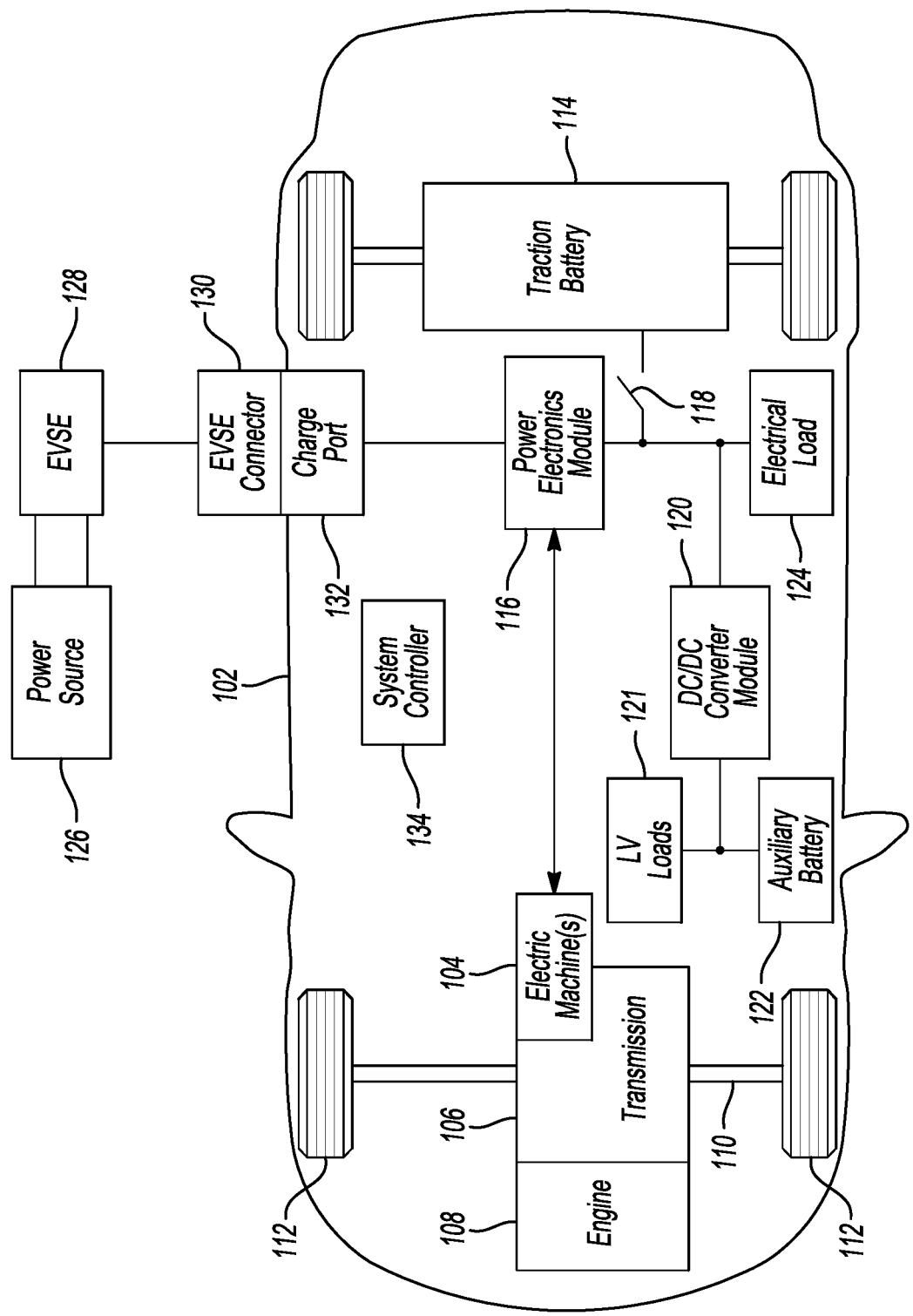

INTEGRATED DC VEHICLE CHARGER

TECHNICAL FIELD

This disclosure relates to automotive electric drive and charging systems.

BACKGROUND

Hybrid-electric vehicles (HEVs) and battery electric vehicles (BEVs) may rely on a traction battery to provide power to a traction motor for propulsion, and a power inverter therebetween to convert direct current (DC) power to alternating current (AC) power. The typical AC traction motor is a three-phase motor powered by three sinusoidal signals each driven with 120 degrees phase separation but other configurations are also possible. Also, many electrified vehicles may include a DC-DC converter to convert the voltage of the traction battery to an operational voltage level of the traction motor.

SUMMARY

A vehicle has a traction battery, an electric machine having two sets of windings that share a common neutral, and first and second inverters. The inverters, during propulsion, each power a dedicated one of the sets of windings with power from the traction battery, and during charge, direct charge current from a charge port sequentially through the first inverter, the windings, and the second inverter to the traction battery.

A vehicle has a drive system including a battery, two inverters, an electric machine, and switches. The vehicle also has a controller that, responsive to charge mode, operates the switches to couple one of the inverters to a charge port and operates at least one of the inverters such that DC current from the charge port sequentially flows through the one of the inverters, the electric machine, and the other of the inverters to the battery.

A method for controlling a vehicle power system includes, by a controller, responsive to charge mode, coupling one of a pair of inverters to a charge port such that DC current from the charge port sequentially flows through the one, an electric machine, and the other of the pair to a traction battery, and responsive to propulsion mode, decoupling the one from the charge port and coupling the one to the traction battery.

BRIEF DESCRIPTION OF THE DRAWINGS

FIG. 4 is a schematic diagram of an electrified vehicle.

DETAILED DESCRIPTION

Figure 1:
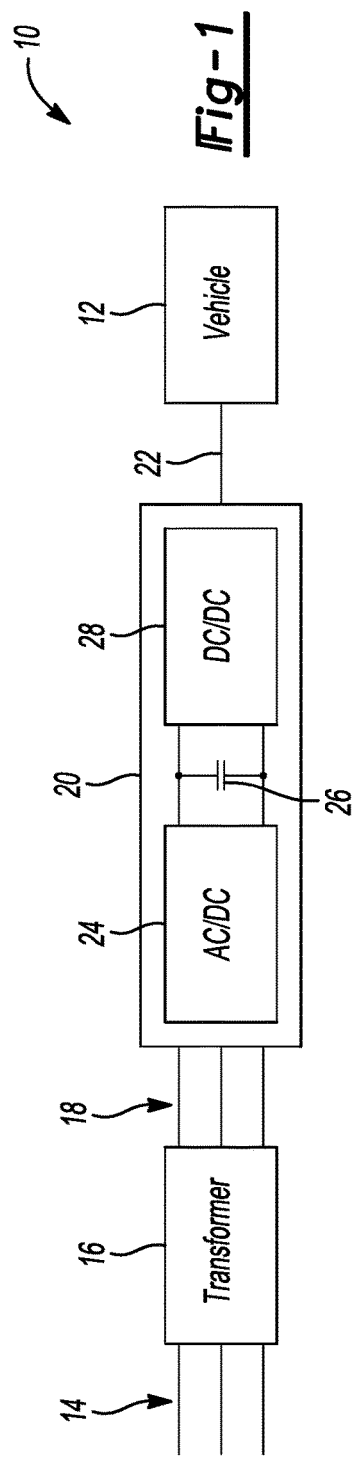
FIG. 1 is a schematic diagram of a conventional off-board DC vehicle fast charge ecosystem.

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Despite differences in their architectures, electric vehicles (EVs) have similarities in their structure. For instance, a battery, inverter, and electric motor are typical building blocks for an EV. To energize the battery and provide power for the motor, two types of chargers can be employed: on-board and off-board (stand-alone) chargers. An on-board charger gives flexibility to charge anywhere there is an electric power outlet available. It may, however, add weight, volume, and cost to the vehicle. Thus, the possibility of avoiding these drawbacks by using available hardware such as the inverter and electric motor to charge the battery is desirable.

Considering that during charging, the vehicle is not driven, and during driving, the battery is not charged except by way of regenerative braking, integration of an on-board charger and traction system seems to be a feasible option. Additionally, DC fast chargers have gained popularity and many have focused on such designs. The significant reduction in charge time is what makes these types of chargers attractive. Here, we propose to use a vehicle's multi-phase electric machine to implement a DC charger. In certain examples, the combination of two symmetric inverters and motor windings form a full bridge DC-DC converter. Activation of some of the switches of one of the inverters and utilization of the diodes of the other of the inverters can result in a decrease in the DC power source voltage at the battery (buck mode). In this scenario, the motor windings act as a filter inductor. Activation of the switches of both of the inverters and utilization of the diodes of the other of the inverters can result in an increase in the DC power source voltage at the battery (boost mode). In this scenario, the motor windings act as a boost inductor. In both scenarios, if the switches are not operated simultaneously, an interleaved operation is possible, which may improve output voltage quality.

Referring to FIG. 1, a conventional off-board DC fast charge ecosystem 10 for a vehicle 12 includes a medium voltage utility grid 14, conventional transformer 16, building wire 18, off-board DC fast charger 20, and charge cord 22. The off-board DC fast charger 20 includes AC/DC converter 24, capacitor 26, and DC/DC converter 28. AC power from the medium voltage utility grid is transferred to the building wire 18 via the conventional transformer 16. The AC power is then converted to DC power in the usual fashion by off-board DC fast charger 20 for delivery to the vehicle 12 via the charge cord 22.

Figure 2:
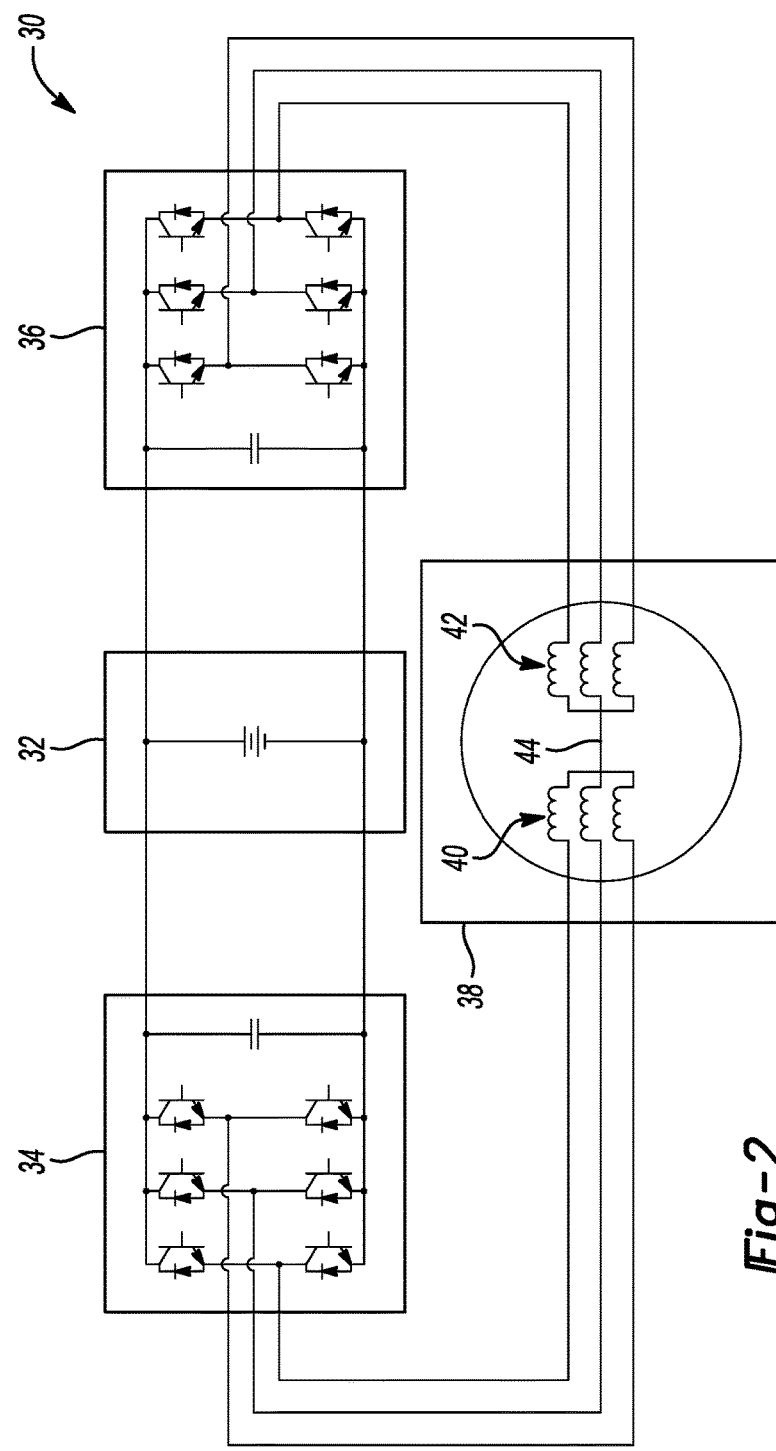
FIG. 2 is a schematic diagram of an electrified vehicle powertrain.

Referring to FIG. 2, a traction drive system 30 includes a traction battery 32, symmetric inverters 34, 36, and an electric machine 38. Each of the inverters 34, 36 includes switching elements and a DC link capacitor as per usual. In other arrangements, only one of the inverters 34, 36 may include a DC link capacitor as known in the art. The electric machine 38 includes two-sets of three windings 40, 42 and a common neutral 44. That is, the electric machine 38 is a six-phase electric machine. During propulsion, DC power from the traction battery 32 is converted by the inverters 34, 36 to AC power for delivery to the electric machine 38. During regenerative braking, AC power from the electric machine 38 is converted by the inverters 34, 36 to DC power for delivery to the traction battery 32.

Figure 3:
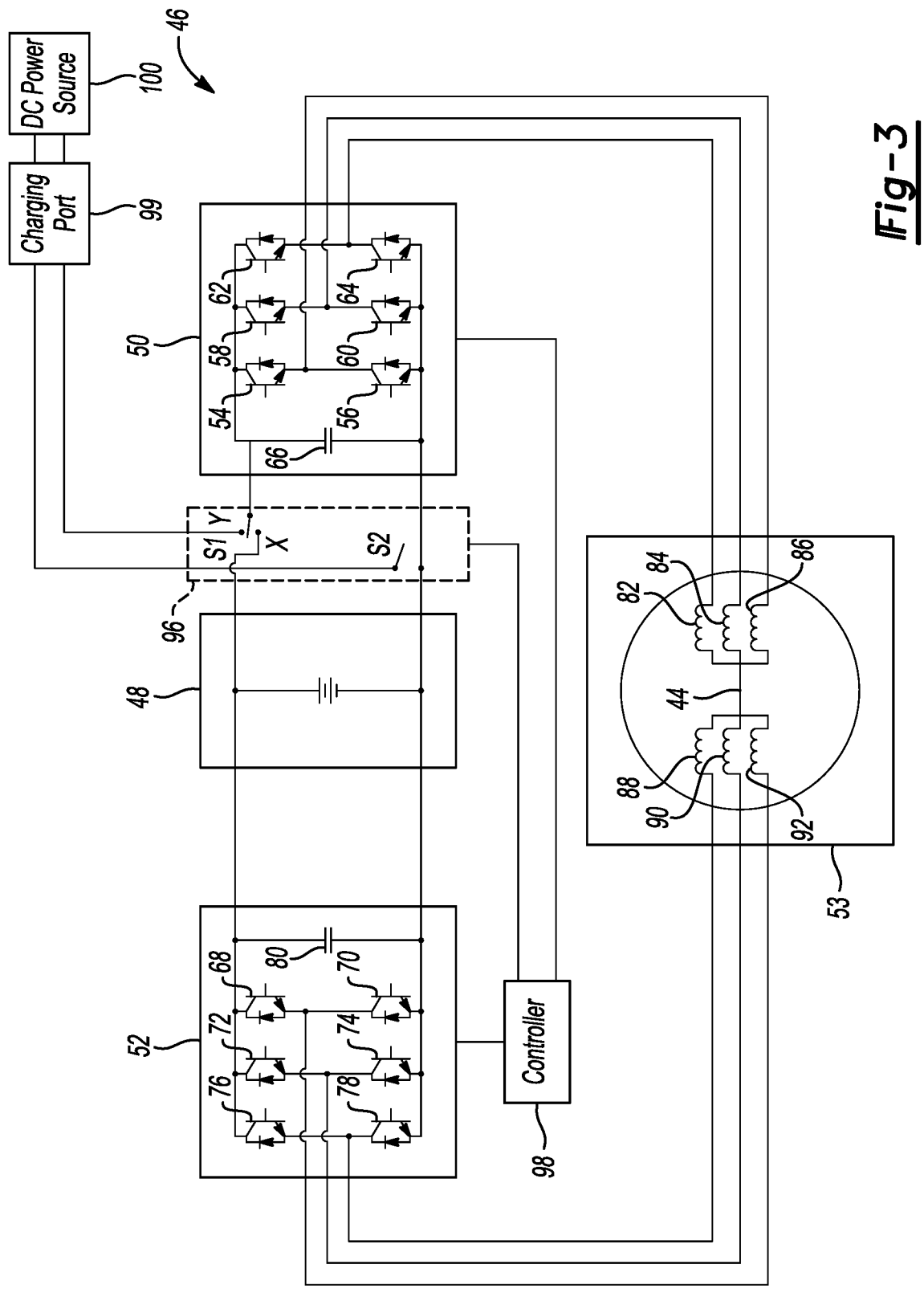
FIG. 3 is a schematic diagram of an electrified vehicle powertrain with integrated DC charge capability.

Referring to FIG. 3, a traction drive system 46 with integrated fast charge capability includes a traction battery 48, inverters 50, 52, and an electric machine 53. In this example, the inverter 50 includes switch-diode pairs 54, 56, 58, 60, 62, 64 and DC link capacitor 66. And, the inverter 52 includes switch-diode pairs 68, 70, 72, 74, 76, 78 and DC link capacitor 80. The electric machine 53 includes windings 82, 84, 86, 88, 90, 92 and common neutral 94. The windings 82, 84, 86 and 88, 90, 92 are arranged in two sets of three. That is, the electric machine 53 is a six-phase electric machine.

In other arrangements, only one of the inverters (e.g., the inverter 52) may include a DC link capacitor. In such arrangements, DC link capability may need to be associated with the charging port 99. Also, the electric machine 53 may include additional sets of windings possibly necessitating the use of additional inverters, etc. Other arrangements are also contemplated.

The traction drive system 46 further includes switching arrangement 96 and controller 98. The switching arrangement 96 includes switches S1, S2 that selectively electrically couple a charging port 99 therewith. The charging port 99 is arranged to receive power from a DC power source 100. The inverters 50, 52, electric machine 53, and switching arrangement 96 are in communication with and/or under the control of the controller 98.

During propulsion, the controller 98 puts switch S1 in position X and opens switch S2 to electrically connect the traction battery 48 to inverter 50 and decouple the charging port 99 from the traction drive system 46. DC power from the traction battery 48 may then be converted to AC power via the inverters 50, 52 for delivery to the electric machine 53.

During charge, the controller 98 puts switch S1 in position Y and closes switch S2 to electrically connect the inverter 50 to the charging port 99 and decouple the traction battery 48 from the inverter 50. DC power from the charging port 99 may then flow through the inverter 50, the electric machine 53, the inverter 52, and to the traction battery 48.

If power from the charging port 99 is to be neither boosted or bucked, the controller 98 may turn on one or more of the switches of the switch-diode pairs 54, 58, 62 such that current flows through the corresponding windings and neutral of the electric machine 53, and the diodes of the corresponding switch-diode pairs 68, 72, 76 to the traction battery 48.

If power from the charging port 99 is to be bucked, the controller 98 may activate one or more of the switches of the switch-diode pairs 54, 58, 62 at some duty cycle such that current intermittently flows through the corresponding windings and neutral of the electric machine 53, and the diodes of the corresponding switch-diode pairs 68, 72, 76 to the traction battery 48.

If power from the charging port 99 is to be boosted, the controller 98 may activate one or more of the switches of the switch diode-pairs 54, 58, 62 and one or more of the switches of the switch-diode pairs 70, 74, 78 at some duty cycle such that current intermittently flows through the corresponding windings and neutral of the electric machine 53 and intermittently flows through the diodes of the corresponding switch-diode pairs 68, 72, 76 and the switches of the corresponding switch-diode pairs 70, 74, 78 to the traction battery 48.

In this design, the switches S1, S2 are used to disconnect the traction battery 48 from the inverter 50. The inverters 50, 52, and the windings 82-92 thus can form a three-way interleaved full bridge DC-DC converter. Therefore, instead of directly connecting the traction battery 48 to the charging port 99 as with a conventional DC fast charging method, a DC-DC stage is added. Since this is a full bridge DC-DC converter, it is capable of boosting and bucking the input voltage as described above. This may make the traction drive system 46 compatible with any commercial DC fast charger regardless of its output voltage level.

Some arrangements may offer certain benefits. The design of the power source, for example, can be simplified since the DC-DC stage is incorporated into the charger. The systems are compatible with different DC voltage levels (different brands and products) since with a full bridge DC-DC converter, the voltage can be adjusted to any desired value. Compared with conventional DC fast charging, there are no added components except for two possible switches. Due to the full control on the output voltage level, trickle charging is feasible. This may be useful if for any reason battery voltage is low and charging at regular power could cause issues. The three-way interleaved design may reduce current ripple on the DC bus and thereby increase component life span. Due to the boosting capability, the input voltage to the charger can be lowered.

The architectures contemplated herein may be implemented within a variety of vehicle configurations. FIG. 4, for example, depicts an electrified vehicle 102 that includes one or more electric machines 104 mechanically coupled to a hybrid transmission 106. The electric machines 104 may operate as a motor or generator. In addition, the hybrid transmission 106 is mechanically coupled to an engine 108 and a drive shaft 110 that is mechanically coupled to the wheels 112.

A traction battery or battery pack 114 stores energy that can be used by the electric machines 104. The vehicle battery pack 114 may provide a high voltage direct current (DC) output. The traction battery 114 may be electrically coupled to one or more power electronics modules 116 that implement the architectures discussed above. One or more contactors 118 may further isolate the traction battery 114 from other components when opened and connect the traction battery 114 to other components when closed. The power electronics module 116 is also electrically coupled to the electric machines 104 and provides the ability to bi-directionally transfer energy between the traction battery 114 and the electric machines 104. For example, the traction battery 114 may provide a DC voltage while the electric machines 104 may operate with alternating current (AC) to function. The power electronics module 116 may convert the DC voltage to AC current to operate the electric machines 104. In regenerative mode, the power electronics module 116 may convert the AC current from the electric machines 104 acting as generators to DC voltage compatible with the traction battery 114.

The vehicle 102 may include a variable-voltage converter (VVC) (not shown) electrically coupled between the traction battery 114 and power electronics module 116. The VVC may be a DC/DC boost converter configured to increase or boost the voltage provided by the traction battery 114. By increasing the voltage, current requirements may be decreased leading to a reduction in wiring size for the power electronics module 116 and the electric machines 104.

Further, the electric machines 104 may be operated with better efficiency and lower losses.

In addition to providing energy for propulsion, the traction battery 114 may provide energy for other vehicle electrical systems. The vehicle 102 may include a DC/DC converter module 120 that converts the high voltage DC output of the traction battery 114 to a low voltage DC supply that is compatible with low-voltage vehicle loads 121. An output of the DC/DC converter module 120 may be electrically coupled to an auxiliary battery 122 (e.g., 12V battery) for charging the auxiliary battery 122. The low-voltage systems may be electrically coupled to the auxiliary battery 122. One or more electrical loads 124 may be coupled to the high-voltage bus. The electrical loads 124 may have an associated controller that operates and controls the electrical loads 124 when appropriate. Examples of electrical loads 124 may include a fan, an electric heating element, and/or an air-conditioning compressor.

The electrified vehicle 102 may be configured to recharge the traction battery 114 from an external power source 126. The external power source 126 may be a connection to an electrical outlet. The external power source 126 may be electrically coupled to a charger or electric vehicle supply equipment (EVSE) 128. The external power source 126 may be an electrical power distribution network or grid as provided by an electric utility company. The EVSE 128 may provide circuitry and controls to regulate and manage the transfer of energy between the power source 126 and the vehicle 102. The external power source 126 may provide DC or AC electric power to the EVSE 128. The EVSE 128 may have a charge connector 130 for plugging into a charge port 132 of the vehicle 102. The charge port 132 may be any type of port configured to transfer power from the EVSE 128 to the vehicle 102. The EVSE connector 130 may have pins that mate with corresponding recesses of the charge port 132. Alternatively, various components described as being electrically coupled or connected may transfer power using a wireless inductive coupling.

In some configurations, the electrified vehicle 102 may be configured to provide power to an external load. For example, the electrified vehicle may be configured to operate as a back-up generator or power outlet. In such applications, a load may be connected to the EVSE connector 130 or other outlet. The electrified vehicle 102 may be configured to return power to the power source 126. For example, the electrified vehicle 102 may be configured to provide alternating current (AC) power to the electrical grid. The voltage supplied by the electrified vehicle may be synchronized to the power line.

Electronic modules in the vehicle 102 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by the Institute of Electrical and Electronics Engineers (IEEE) 802 family of standards. Additional channels of the vehicle network may include discrete connections between modules and may include power signals from the auxiliary battery 122. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown but it may be implied that the vehicle network may connect to any electronic module that is present in the vehicle 102. A vehicle system controller (VSC) 134 may be present to coordinate the operation of the various components.

The vehicle 102 also includes the DC/DC converter module 120 for converting the voltage of the high-voltage bus to a voltage level suitable for the auxiliary battery 122 and low-voltage loads 121 (e.g., around 12 Volts). The vehicle 102 may further include additional switches, contactors, and circuitry to selectively select power flow between the traction battery 114 to the DC/DC converter 120.

The processes, methods, logic, or strategies disclosed may be deliverable to and/or implemented by a processing device, controller, or computer, which may include any existing programmable electronic control unit or dedicated electronic control unit. Similarly, the processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   a traction battery;
   an electric machine having two sets of windings that share a common neutral; and
   first and second inverters configured to,
      during propulsion, each power a dedicated one of the sets of windings with power from the traction battery, and
      during charge, direct DC charge current from a charge port sequentially through each of the first inverter, the windings, and the second inverter to the traction battery.

2. The vehicle of claim 1 further comprising a switching arrangement configured to, during propulsion, selectively couple the first inverter to the traction battery and decouple the first inverter from the charge port.

3. The vehicle of claim 1 further comprising a switching arrangement configured to, during charge, selectively couple the first inverter to the charge port and decouple the first inverter from the traction battery.

4. The vehicle of claim 1 further comprising a controller programmed to, during charge, operate the inverters to reduce a voltage at the traction battery.

5. The vehicle of claim 1 further comprising a controller programmed to, during charge, operate the inverters to increase a voltage at the traction battery.

6. The vehicle of claim 1, wherein the electric machine is a six-phase electric machine.

7. A vehicle comprising:
a drive system including a battery, two inverters, an electric machine, and switches; and
a controller programmed to, responsive to charge mode, operate the switches to couple one of the inverters to a charge port and operate at least one of the inverters such that DC current from the charge port sequentially flows through the one of the inverters, the electric machine, and the other of the inverters to the battery.

8. The vehicle of claim 7, wherein the controller is further programmed to operate the inverters to reduce a voltage at the battery.

9. The vehicle of claim 7, wherein the controller is further programmed to operate the inverters to increase a voltage at the battery.

10. The vehicle of claim 7, wherein the controller is further programmed to, responsive to propulsion mode, operate the switches to couple the one of the inverters to the battery and decouple the one of the inverters from the charge port such that each of the inverters powers a set of windings of the electric machine.

11. The vehicle of claim 7, wherein the electric machine includes two sets of windings that share a common neutral.

12. A method for controlling a vehicle power system comprising:
by a controller,
responsive to charge mode, coupling one of a pair of inverters to a charge port such that DC current from the charge port sequentially flows through the one, an electric machine, and the other of the pair to a traction battery, and
responsive to propulsion mode, decoupling the one from the charge port and coupling the one to the traction battery.

13. The method of claim 12 further comprising operating at least one of the inverters to reduce a voltage at the traction battery.

14. The method of claim 12 further comprising operating at least one of the inverters to increase a voltage at the traction battery.

15. The method of claim 12 further comprising operating at least one of the inverters to maintain a voltage at the traction battery.

* * * * *